United States Patent
Wang et al.

(10) Patent No.: US 11,448,558 B2
(45) Date of Patent: Sep. 20, 2022

(54) MICHELSON INTERFERENCE OPTICAL FIBER TEMPERATURE SENSOR FOR DETECTING CONTRAST CHANGE OF FRINGES

(71) Applicant: Guangdong Ocean University, Zhanjiang (CN)

(72) Inventors: Wenhua Wang, Zhanjiang (CN); Wenqing Shi, Zhanjiang (CN); Zhengye Xiong, Zhanjiang (CN); Weina Wu, Zhanjiang (CN); Yansheng Zhang, Zhanjiang (CN); Yuanzheng Luo, Zhanjiang (CN); Yuping Xie, Zhanjiang (CN); Xianxiang Fei, Zhanjiang (CN); Jiang Huang, Zhanjiang (CN); Xuehui Lai, Zhanjiang (CN); Chuhong Wang, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/741,834

(22) Filed: May 11, 2022

(65) Prior Publication Data
US 2022/0268641 A1  Aug. 25, 2022

Related U.S. Application Data

(63) Continuation of application No. PCT/CN2021/136286, filed on Dec. 8, 2021.

(30) Foreign Application Priority Data

Feb. 8, 2021 (CN) .......................... 202110180490.8

(51) Int. Cl.
*H04B 10/00* (2013.01)
*G01K 11/32* (2021.01)
*G02B 6/42* (2006.01)

(52) U.S. Cl.
CPC ............ *G01K 11/32* (2013.01); *G02B 6/4215* (2013.01); *G02B 6/4237* (2013.01); *G02B 6/4239* (2013.01)

(58) Field of Classification Search
CPC combination set(s) only.
See application file for complete search history.

(56) References Cited

U.S. PATENT DOCUMENTS 4,725,143 A * 2/1988 Jones ..................... G01D 5/344
                                              250/227.27
4,868,381 A * 9/1989 Davis ..................... G01K 11/32
                                              250/227.27

(Continued)

*Primary Examiner* — Agustin Bello
(74) *Attorney, Agent, or Firm* — WPAT, PC

(57) ABSTRACT

A Michelson interference optical fiber temperature sensor for detecting fringe contrast change is provided. It includes a light source, an optical fiber coupler connected to a first optical fiber and a second optical fiber, a coarse wavelength division multiplexer, a first photodetector, a second photodetector, a display device, and a processing circuit connected to the display device. The light source, optical fiber coupler and coarse wavelength division multiplexer are connected sequentially in that order. The coarse wavelength division multiplexer is connected to the first photodetector and the second photodetector individually. The first photodetector and the second photodetector are connected to the processing circuit. An end of the first optical fiber or the second optical fiber facing away from the optical fiber coupler is connected to a semiconductor. It has advantages of simple and fast manufacturing process, safe and reliable sensor, stable signal, low cost, high sensitivity and high precision.

9 Claims, 1 Drawing Sheet

(56) References Cited

U.S. PATENT DOCUMENTS

| | | | |
|---|---|---|---|
| 4,928,005 A * | 5/1990 | Lefevre | G01K 11/32 250/227.24 |
| 5,227,857 A * | 7/1993 | Kersey | G01B 9/0207 250/227.27 |
| 5,757,487 A * | 5/1998 | Kersey | G01D 5/35383 356/478 |
| 6,097,487 A * | 8/2000 | Kringlebotn | G01J 9/0246 356/450 |
| 6,137,573 A * | 10/2000 | Luke | G01D 5/35387 356/453 |
| 6,335,524 B1 * | 1/2002 | Udd | G01D 5/35383 250/227.14 |
| 6,888,125 B2 * | 5/2005 | Ronnekleiv | G01D 5/35383 250/227.19 |
| 7,060,967 B2 * | 6/2006 | Thingbo | G01D 5/3539 385/12 |
| 7,268,884 B2 * | 9/2007 | Kringlebotn | G01J 3/1895 356/477 |
| 7,423,759 B2 * | 9/2008 | Masuda | G01J 9/0246 356/450 |
| 7,466,422 B2 * | 12/2008 | Waagaard | G01D 5/3539 356/478 |
| 7,488,929 B2 * | 2/2009 | Townley-Smith | G08B 13/186 250/227.14 |
| 8,983,287 B2 * | 3/2015 | Goldner | G01H 9/004 356/73.1 |
| 9,810,556 B2 * | 11/2017 | Ouellette | G01D 5/35383 |
| 9,823,098 B2 * | 11/2017 | Bastianini | H01S 3/302 |
| 10,001,362 B2 * | 6/2018 | Ronnekleiv | G01D 5/3539 |
| 10,036,672 B2 * | 7/2018 | Iwamura | G01K 11/32 |
| 10,247,581 B2 * | 4/2019 | Ronnekleiv | G01B 9/02 |
| 10,422,868 B2 * | 9/2019 | Efimov | G01N 21/47 |
| 11,280,687 B2 * | 3/2022 | Champavere | G01D 5/35361 |
| 2002/0051598 A1 * | 5/2002 | Atoji | G02B 6/34 385/11 |
| 2003/0142319 A1 * | 7/2003 | Ronnekleiv | G01D 5/35383 356/477 |
| 2003/0227632 A1 * | 12/2003 | Marcus | G01B 9/02007 356/497 |
| 2004/0071185 A1 * | 4/2004 | Syracuse | G01K 11/32 374/E11.015 |
| 2005/0230607 A1 * | 10/2005 | Nebendahl | G01K 11/32 374/E11.015 |
| 2006/0221344 A1 * | 10/2006 | Masuda | G01J 9/0246 356/451 |
| 2007/0165238 A1 * | 7/2007 | Boyd | G01L 9/0079 356/478 |
| 2007/0263225 A1 * | 11/2007 | Huang | G01D 5/35335 356/477 |
| 2009/0103072 A1 * | 4/2009 | Fromme | G01M 11/3172 356/3 |
| 2017/0108358 A1 * | 4/2017 | Bastianini | G01D 5/35383 |
| 2018/0172809 A1 * | 6/2018 | Efimov | G01S 17/95 |
| 2021/0333089 A1 * | 10/2021 | Han | G01B 9/02003 |
| 2021/0341337 A1 * | 11/2021 | Chevalier | G01J 5/06 |
| 2021/0381908 A1 * | 12/2021 | Tadayon | G01K 15/005 |

* cited by examiner

MICHELSON INTERFERENCE OPTICAL FIBER TEMPERATURE SENSOR FOR DETECTING CONTRAST CHANGE OF FRINGES

TECHNICAL FIELD

The present disclosure relates to the cross field of optical fiber Michelson interference and semiconductor materials, and more particularly to a Michelson interference optical fiber temperature sensor for detecting a contrast change of interference fringes.

BACKGROUND

Optical fiber sensors have advantages of electrical insulation, electromagnetic interference resistance, high sensitivity, high temperature resistance, corrosion resistance and passive sensor end, so that the optical fiber sensors are intrinsically safe and can be transmitted for a long distance without signal conversion and amplifiers. In addition, the optical fiber sensors are small in size and light in weight, and therefore they are widely used in communications, civil engineering, petrochemical, aerospace and other fields. Michelson optical fiber interference technology is one of main technologies commonly used in optical fiber sensors, which has advantages of simple structure and low technical requirements for manufacturing. It is commonly used in the measurement of air refractive index and underwater acoustic signals, etc. The measurement process mainly depends on the counting of interference fringes or the fringe movement, which requires high signal demodulation, especially in measurement occasions with high precision and high sensitivity.

In theory, Michelson fiber interference technology can also be used for the measurement of ambient temperature. The light source can adopt broadband light source and narrowband laser light source. When using the narrowband laser light source is used for measurement, the method of fringe counting or fringe movement is usually used for measurement. In this situation, the signal demodulation is more complicated and requires high requirements, and the sensitivity and accuracy of the sensor will be reduced when the signal demodulation method is imperfect. When the broadband light source is used for measurement, due to the interference effect is very low, the interference peak tracking is usually used to realize parameter measurement, but the peak tracking measurement method has the disadvantage of low accuracy. In addition, the interference peak tracking can be realized with the help of other precision instruments to realize temperature measurement, but it often leads to the complexity and high cost of the system. Therefore, there are few reports about the optical fiber temperature sensor based on Michelson interference, and it is necessary to provide a Michelson interference optical fiber temperature sensor for detecting a contrast change of fringes, so as to overcome the current shortcomings and realize the temperature measurement.

SUMMARY

A purpose of the disclosure is to provide a Michelson interference optical fiber temperature sensor for detecting a contrast change of interference fringes, so as to solve the technical problems existing in the prior art. A manufacturing process is simple and fast. The sensor has advantages of safety and reliability, signal stability, low cost, high sensitivity and high precision, and can realize a high-precision measurement of temperature without relying on other precision instruments.

In order to achieve the above purpose, the disclosure provides solutions as follows. Specifically, the disclosure provides a Michelson interference optical fiber temperature sensor for detecting a contrast change of interference fringes, including a light source, an optical fiber coupler, a coarse wavelength division multiplexer, a first photodetector, a second photodetector, a processing circuit, a display device, a first optical fiber, a second optical fiber, and a semiconductor. The light source, the optical fiber coupler and the coarse wavelength division multiplexer are connected sequentially in that order. The coarse wavelength division multiplexer is connected to the first photodetector and the second photodetector individually, the first photodetector and the second photodetector both are connected to the processing circuit, and the processing circuit is connected to the display device.

The optical fiber coupler is further connected to the first optical fiber and the second optical fiber, and an end of one of the first optical fiber and the second optical fiber facing away from the optical fiber coupler is connected to the semiconductor.

The light source is configured (i.e., structured and arranged) to transmit optical signals.

The optical fiber coupler is configured to couple and distribute the optical signals transmitted by the light source and the optical signals returned by the first optical fiber and the second optical fiber.

The coarse wavelength division multiplexer is configured to demultiplex the optical signals returned by the first optical fiber and the second optical fiber to obtain a broadband optical signal and a narrowband optical signal.

The first photodetector and the second photodetector are respectively configured to receive the broadband optical signal and the narrowband optical signal obtained by the demultiplexing of the coarse wavelength division multiplexer.

The processing circuit is configured to process the broadband optical signal and the narrowband optical signal received by the first photodetector and the second photodetector, detect a contrast change of the interference fringes, and demodulate, based on the contrast change of the interference fringes, a temperature detection result.

The display device is configured to display the temperature detection result obtained by the demodulating.

In an embodiment, the first optical fiber and the second optical fiber each are one of a single-mode optical fiber and a multimode optical fiber, and the optical fiber coupler is a 3 decibels (dB) coupler.

In an embodiment, the second optical fiber is connected to the semiconductor, a length of the first optical fiber is approximately equal to a sum of lengths of the second optical fiber and the semiconductor, and the first optical fiber and the second optical fiber are in a same environment.

In an embodiment, an end face of an end of the first optical fiber facing away from the optical fiber coupler is coated with a first reflective film; an end of the semiconductor is connected to the second optical fiber, an end face of the other end of the semiconductor is a cleavage plane, and the cleavage plane is coated with a second reflective film.

In an embodiment, an end face of the semiconductor coated with the second reflective film is perpendicular to an axis of the semiconductor, and an end face of the semiconductor connected to the second optical fiber is a first inclined plane.

In an embodiment, an outer side of the second optical fiber is sleeved with a first sleeve, an end face of the second optical fiber connected to the semiconductor is a second inclined plane, the second inclined plane of the second optical fiber corresponds to the first inclined plane of the semiconductor, outer sides of the first sleeve and the semiconductor are both sleeved with a second sleeve, to thereby make the second optical fiber and the semiconductor be fixedly assembled through the second sleeve.

In an embodiment, the second sleeve is a metal sleeve.

In an embodiment, a material of the semiconductor is gallium arsenide, or other semiconductor materials with a change of one of transmissivity and absorbance greater than that of the gallium arsenide when affected by a change in ambient temperature at a same wavelength of incident light.

In an embodiment, a linewidth of the narrowband optical signal obtained by the demultiplexing of the coarse wavelength division multiplexer is less than or equal to 5 nanometers (nm), and a linewidth of the broadband optical signal obtained by the demultiplexing of the coarse wavelength division multiplexer is greater than or equal to 40 nm.

In an embodiment, the processing circuit is further configured to perform amplification processing on the broadband optical signal and the narrowband optical signal received by the first photodetector and the second photodetector, make the narrowband optical signal of the second photodetector after the amplification processing divide by the broadband optical signal of the first photodetector after the amplification processing to obtain phase information and phase change information of the interference fringes, to thereby obtain information of the contrast change of the interference fringes, and obtain a change of ambient temperature based on the change the information of the contrast change of interference fringes.

The disclosure may disclose at least technical effects as follows.

The disclosure makes full use of the advantages that the interference signal of the optical fiber interferometer can realize high-precision measurement, and designs the sensor as the detection of contrast change, that is, light intensity detection, so as to simplify signal demodulation and realize high-sensitivity and high-precision measurement. At normal temperature, the optical signals sent by the light source can return to the same value of optical power after entering the first optical fiber and the second optical fiber respectively, and reach the coupler to produce interference fringes with a contrast equal to 1. When the temperature changes, the transmissivity of the semiconductor changes greatly, and the optical power returned by the second optical fiber also changes greatly with the transmissivity, resulting in a large change in the contrast while the interference fringes move. Subsequently, the returned optical signals are divided into two paths by the coarse wavelength division multiplexer, which are detected and processed respectively to determine the specific change of contrast. In addition, it can eliminate the influence of the signal fluctuation of light source and the change of optical fiber loss, and demodulate the corresponding ambient temperature.

The Michelson interference optical fiber temperature sensor for detecting the contrast change of fringes proposed by the disclosure has the advantages of simple and fast manufacturing process, safe and reliable sensor, stable signal, low cost, high sensitivity and high precision, and can realize high-precision temperature measurement without relying on other precision instruments.

BRIEF DESCRIPTION OF DRAWINGS

In order to more clearly illustrate embodiments of the disclosure or technical solutions in the prior art, the drawings required in the embodiments will be briefly introduced below. Obviously, the drawings in the following description are only some embodiments of the disclosure. For those skilled in the related art, other drawings can be derived from these drawings without paying creative labor.

DETAILED DESCRIPTION OF EMBODIMENTS

Technical solutions in the embodiments of the disclosure will be clearly and completely described below in conjunction with the accompanying drawings in the embodiments of the disclosure. Obviously, the described embodiments are only some of the embodiments of the disclosure, and not all of them. Based on the embodiments in the disclosure, all other embodiments obtained by those skilled in the related art without making creative labor fall within the scope of protection of the disclosure.

In order to make the above-mentioned purposes, features and advantages of the disclosure more obvious and understandable, the disclosure is described in further detail below in combination with the accompanying drawings and specific embodiments.

Figure 1:
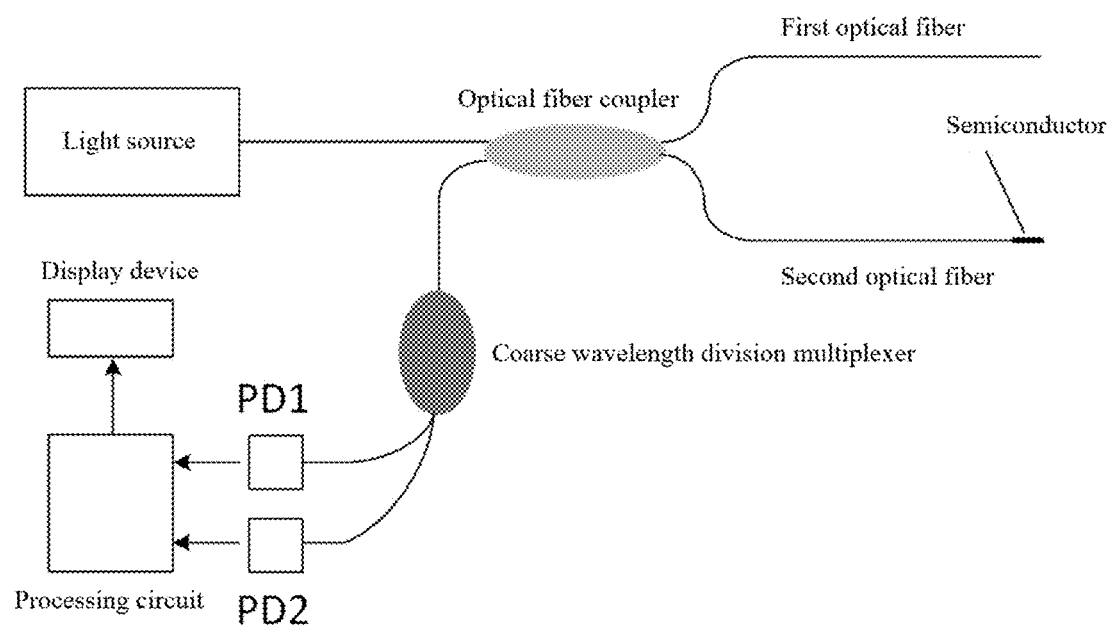
FIG. 1 is a schematic structural diagram of a Michelson interference optical fiber temperature sensor for detecting a contrast change of interference fringes according to an embodiment of the disclosure.

Referring to FIG. 1, this embodiment provides a Michelson interference optical fiber temperature sensor for detecting a change contrast of interference fringes, including:

a light source, an optical fiber coupler, a coarse wavelength division multiplexer, a first photodetector PD1, a second photodetector PD2, a processing circuit, a display device, a first optical fiber, a second optical fiber, and a semiconductor. The light source, the optical fiber coupler and the coarse wavelength division multiplexer are connected sequentially in that order, the coarse wavelength division multiplexer is connected to the first photodetector and the second photodetector individually, the first photodetector and the second photodetector are connected to the processing circuit, and the processing circuit is connected to the display device.

Specifically, the optical fiber coupler is further connected to the first optical fiber and the second optical fiber, and an end of one of the first optical fiber and the second optical fiber facing away from the optical fiber coupler is connected to the semiconductor.

The light source adopts a broadband light source and is configured to transmit optical signals.

The optical fiber coupler is configured to couple and distribute the optical signals transmitted by the light source and optical signals returned by the first optical fiber and the second optical fiber.

The coarse wavelength division multiplexer is configured to demultiplex the optical signals returned by the first optical fiber and the second optical fiber to obtain a broadband optical signal and a narrowband optical signal.

The first photodetector and the second photodetector are respectively configured to receive the broadband optical signal and the narrowband optical signal obtained by the demultiplexing of the coarse wavelength division multiplexer.

The processing circuit is configured to process the broadband optical signal and the narrowband optical signal received by the first photodetector and the second photodetector, detect a contrast change of the interference fringes, and demodulate, based on the contrast change of the interference fringes, to obtain a temperature detection result.

The display device is configured to display the temperature detection result obtained by the demodulating.

In an illustrated embodiment, the first optical fiber and the second optical fiber each are one of a single-mode optical fiber and a multimode optical fiber, and the optical fiber coupler is a 3 decibels (dB) coupler, so that the contrast of the interference fringes is as close as possible to 1.

In an illustrated embodiment, the second optical fiber is connected to the semiconductor, a length of the first optical fiber is approximately equal to a sum of lengths of the second optical fiber and the semiconductor, and a length tolerance is ±0.5 millimeters (mm). In addition, the first optical fiber and the second optical fiber are in a same environment, so that the influence of the environment on the first optical fiber and the second optical fiber is basically the same, so as to avoid the interference of the environment on the interference test signals.

In an illustrated embodiment, an end face of an end of the first optical fiber facing away from the optical fiber coupler is coated with a first reflective film.

The semiconductor is a cylinder with a diameter of 1-2 mm, and an axis length of the semiconductor is in a range of 0.1-10 mm. An end of the semiconductor is connected to the second optical fiber, the other end of the semiconductor is a cleavage plane, and the cleavage plane is coated with a second reflective film, so that the optical power of the optical signals returned by the first optical fiber and the second optical fiber to the optical fiber coupler is basically equal.

In an illustrated embodiment, an end face of the semiconductor coated with the second reflective film is perpendicular to an axis of the semiconductor, an end face of the semiconductor connected to the second optical fiber is a first inclined plane, and an included angle between the first inclined plane and the axis of the semiconductor is in in a range of 6°-20°.

Figure 2:
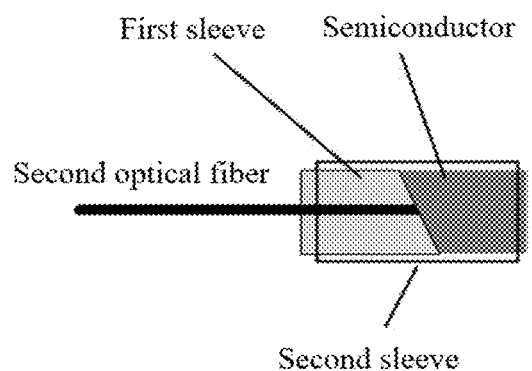
FIG. 2 is a schematic assembly diagram of a second optical fiber and a semiconductor according to an embodiment of the disclosure.

In an illustrated embodiment, an outer side of the second optical fiber is sleeved with a first sleeve, and the second optical fiber is bonded in the first sleeve with an optical ultraviolet curing adhesive or fixed in the first sleeve by laser welding. An end face of the second optical fiber connected to the semiconductor is a second inclined plane, and an included angle between the second inclined plane and an axis of the first sleeve is 6°-20°. A length of the axis of the first sleeve is in a range of 5-7 mm and a diameter thereof is in a range of 1-2 mm. The second inclined plane of the second optical fiber corresponds to the first inclined plane of the semiconductor, outer sides of the first sleeve and the semiconductor both are sleeved with a second sleeve, and the second optical fiber and the semiconductor are fixedly assembled through the second sleeve, as shown in FIG. 2. The purpose of setting the connecting end face of the second optical fiber and the semiconductor as an inclined plane is to sharply reduce the power of the end faces of the second optical fiber and the semiconductor to reflect the optical signal back to the optical fiber coupler, so as to reduce the interference to the temperature test.

An assembly method of the second optical fiber and the semiconductor is as follows.

Specifically, the second optical fiber is fixed in the first sleeve;

the end face of the second optical fiber connected to the semiconductor is processed into the second inclined plane together with the first sleeve;

the second inclined plane of the second optical fiber is placed in parallel with the first inclined plane of the semiconductor, so that the second inclined plane is in contact with the first inclined plane; and the second optical fiber and the semiconductor are encapsulated in the second sleeve to thereby complete the assembly of the second optical fiber and the semiconductor.

In an illustrated embodiment, the second sleeve is a metal sleeve with a high thermal conductivity, specifically, the thermal conductivity is greater than 380 Watts per meter per Kelvin (W/(m K)).

In an illustrated embodiment, a material of the semiconductor is one of selected from a group consisting of gallium arsenide, and semiconductor materials with a change in one of transmissivity and absorbance greater than that of the gallium arsenide when affected by a change in ambient temperature at a same wavelength of incident light. When the ambient temperature changes, the first optical fiber is not connected to the semiconductor, and the returned optical power basically does not change. While the second optical fiber is connected to the semiconductor, the returned optical fiber changes greatly when the temperature changes, resulting in a large change in the contrast of the interference fringes formed by the first optical fiber and the second optical fiber, and finally realize the accurate and sensitive measurement of the ambient temperature.

In an illustrated embodiment, a linewidth of the narrowband optical signal obtained by the demultiplexing of the coarse wavelength division multiplexer is less than or equal to 5 nanometers (nm), and a linewidth of the broadband optical signal is greater than or equal to 40 nm, so that the interference effect of the broadband optical signal basically disappears. The broadband optical signal received by the first photodetector only includes information of light source power, fluctuation and optical fiber loss, and the change of optical splitting ratio of optical fiber coupler caused by the change of light source. The narrowband optical signal still has good interference effect. The narrowband optical signal received by the second photodetector not only includes phase information, but also includes information of light source power, light source fluctuation and optical fiber loss, information on the change of optical splitting ratio of optical fiber coupler caused by the change of light source, and information on the change of transmissivity (or absorbance) of the semiconductor caused by temperature change. After the processing circuit performs amplification processing on the broadband optical signal and the narrowband optical signal detected by the first photodetector and the second photodetector, the processing circuit makes an output (i.e., the processed narrowband optical signal) of the second photodetector divide by an output (i.e., the processed broadband optical signal) of the first photodetector to eliminate the information of light source power, light source fluctuation and optical fiber loss, the change of splitting ratio of optical fiber coupler caused by the change of light source, and finally obtain phase information of interference fringes and change information of transmissivity (or absorbance) of the semiconductor caused by temperature change. Information of the contrast change of the interference fringes is obtained based on the change information of the transmissivity or absorbance of the semiconductor, and a change of the ambient temperature is obtained based on the information of the contrast change of the interference fringes. Therefore, the change of ambient temperature can be accurately demodulated based on the information of the contrast change of the interference fringes.

The working process of the Michelson interference optical fiber temperature sensor for detecting the contrast change of fringes is as follows.

The optical signals emitted by the light source enters the first optical fiber and the second optical fiber respectively after being subjected to light splitting by the optical fiber coupler, return to the optical fiber coupler along original paths after being transmitted by the first optical fiber and the second optical fiber, and are demultiplexed by the coarse wavelength division multiplexer to obtain the broadband optical signal and the narrowband optical signal. The broadband optical signal and the narrowband optical signal are received by the first photodetector and the second photodetector respectively. The broadband optical signal and the narrowband optical signal received by the first photodetector and the second photodetector are processed by the processing circuit, detected the change contrast of interference fringes, demodulated the temperature detection result based on the contrast change of the interference fringes, and displayed through the display device.

The disclosure may disclose at least technical effects as follows.

The disclosure makes full use of the advantages that the interference signal of the optical fiber interferometer can realize high-precision measurement, and designs the sensor as the detection of contrast change, that is, light intensity detection, so as to simplify signal demodulation and realize high-sensitivity and high-precision measurement. At normal temperature, the optical signals sent by the light source can return to the same value of optical power after entering the first optical fiber and the second optical fiber respectively, and reach the coupler to produce interference fringes with a contrast equal to 1. When the temperature changes, the transmissivity of the semiconductor changes greatly, and the optical power returned by the second optical fiber changes greatly, resulting in a large change in the contrast while the interference fringes move. Subsequently, the returned optical signals are divided into two paths by the coarse wavelength division multiplexer, which are detected and processed respectively to determine the specific change of contrast. In addition, it can eliminate the influence of the signal fluctuation of light source and the change of optical fiber loss, and demodulate the corresponding ambient temperature.

The Michelson interference optical fiber temperature sensor for detecting the contrast change of fringes proposed by the disclosure has the advantages of simple and fast manufacturing process, safe and reliable sensor, stable signal, low cost, high sensitivity and high precision, and can realize high-precision temperature measurement without relying on other precision instruments.

The embodiments described above only describe the preferred mode of the disclosure, and do not limit the scope of the disclosure. On the premise of not deviating from the design spirit of the disclosure, various modifications and changes made by those skilled in the related art to the technical solution of the disclosure shall fall within the protection scope determined by the claims of the disclosure.

What is claimed is:

1. A Michelson interference optical fiber temperature sensor for detecting a contrast change of interference fringes, comprising:
   a light source, an optical fiber coupler, a coarse wavelength division multiplexer, a first photodetector, a second photodetector, a processing circuit, a display device, a first optical fiber, a second optical fiber, and a semiconductor;
   wherein the light source, the optical fiber coupler and the coarse wavelength division multiplexer are connected sequentially in that order, the coarse wavelength division multiplexer is connected to the first photodetector and the second photodetector individually, the first photodetector and the second photodetector are connected to the processing circuit, and the processing circuit is connected to the display device;
   wherein the optical fiber coupler is further connected to the first optical fiber and the second optical fiber, and an end of one of the first optical fiber and the second optical fiber facing away from the optical fiber coupler is connected to the semiconductor;
   wherein the light source is configured to transmit optical signals;
   wherein the optical fiber coupler is configured to couple and distribute the optical signals transmitted by the light source and optical signals returned by the first optical fiber and the second optical fiber;
   wherein the coarse wavelength division multiplexer is configured to demultiplex the optical signals returned by the first optical fiber and the second optical fiber to obtain a broadband optical signal and a narrowband optical signal;
   wherein the first photodetector and the second photodetector are respectively configured to receive the broadband optical signal and the narrowband optical signal obtained by the demultiplexing of the coarse wavelength division multiplexer;
   wherein the processing circuit is configured to process the broadband optical signal and the narrowband optical signal received by the first photodetector and the second photodetector, detect a contrast change of the interference fringes, and demodulate, based on the contrast change of the interference fringes, to obtain a temperature detection result;
   wherein the display device is configured to display the temperature detection result obtained by the demodulating; and
   wherein the processing circuit is specifically configured to perform amplification processing on the broadband optical signal and the narrowband optical signal received by the first photodetector and the second photodetector, make the narrowband optical signal of the second photodetector after the amplification processing divide by the broadband optical signal of the first photodetector after the amplification processing to obtain phase information and phase change information of the interference fringes, to thereby obtain information of the contrast change of the interference fringes, and obtain a change of ambient temperature based on the information of the contrast change of the interference fringes.

2. The Michelson interference optical fiber temperature sensor according to claim 1, wherein the first optical fiber and the second optical fiber each are one of a single-mode optical fiber and a multi-mode optical fiber, and the optical fiber coupler is a 3 decibels (dB) coupler.

3. The Michelson interference optical fiber temperature sensor according to claim 1, wherein the second optical fiber is connected to the semiconductor, a length of the first optical fiber is equal to a sum of lengths of the second optical fiber and the semiconductor, and the first optical fiber and the second optical fiber are in a same environment.

4. The Michelson interference optical fiber temperature sensor according to claim 1, wherein an end face of an end of the first optical fiber facing away from the optical fiber coupler is coated with a first reflective film; and
   an end of the semiconductor is connected to the second optical fiber, an end face of the other end of the semiconductor is a cleavage plane, and the cleavage plane is coated with a second reflective film.

5. The Michelson interference optical fiber temperature sensor according to claim 4, wherein the end face of the semiconductor coated with the second reflective film is perpendicular to an axis of the semiconductor, and an end face of the semiconductor connected to the second optical fiber is a first inclined plane.

6. The Michelson interference optical fiber temperature sensor according to claim 5, wherein an outer side of the second optical fiber is sleeved with a first sleeve, an end face of the second optical fiber connected to the semiconductor is a second inclined plane, the second inclined plane of the second optical fiber corresponds to the first inclined plane of the semiconductor, outer sides of the first sleeve and the semiconductor both are sleeved with a second sleeve, to thereby make the second optical fiber and the semiconductor be fixedly assembled through the second sleeve.

7. The Michelson interference optical fiber temperature sensor according to claim 6, wherein the second sleeve is a metal sleeve.

8. The Michelson interference optical fiber temperature sensor according to claim 1, wherein a material of the semiconductor is one selected from gallium arsenide and semiconductor materials with a change in one of transmissivity and absorbance greater than that of the gallium arsenide when affected by a change in ambient temperature at a same wavelength of incident light.

9. The Michelson interference optical fiber temperature sensor according to claim 1, wherein a linewidth of the narrowband optical signal obtained by the demultiplexing of the coarse wavelength division multiplexer is less than or equal to 5 nanometers (nm), and a linewidth of the broadband optical signal obtained by the demultiplexing of the coarse wavelength division multiplexer is greater than or equal to 40 nm.

* * * * *